US007702669B2

(12) United States Patent
Vendrow et al.

(10) Patent No.: US 7,702,669 B2
(45) Date of Patent: Apr. 20, 2010

(54) SYNCHRONIZATION IN UNIFIED MESSAGING SYSTEMS

(75) Inventors: Vlad Vendrow, Redwood Shores, CA (US); Vlad Shmunis, Hillsborough, CA (US)

(73) Assignee: RingCentral, Inc., San Mateo, CA (US)

( * ) Notice: Subject to any disclaimer, the term of this patent is extended or adjusted under 35 U.S.C. 154(b) by 1068 days.

(21) Appl. No.: 11/219,532

(22) Filed: Sep. 2, 2005

(65) Prior Publication Data

US 2006/0062356 A1 Mar. 23, 2006

Related U.S. Application Data

(60) Provisional application No. 60/607,220, filed on Sep. 2, 2004.

(51) Int. Cl.
 *G06F 17/30* (2006.01)
(52) U.S. Cl. ...................................................... 707/620
(58) Field of Classification Search ................... 707/10, 707/200–204; 455/413, 414.1; 379/93.24, 379/88.13, 100.08; 714/20; 718/104; 709/206, 709/218; 726/26
See application file for complete search history.

(56) References Cited

U.S. PATENT DOCUMENTS

| 6,643,669 | B1 * | 11/2003 | Novak et al. | 707/201 |
| 7,024,474 | B2 * | 4/2006 | Clubb et al. | 709/223 |
| 7,047,525 | B2 * | 5/2006 | Prunty et al. | 717/137 |
| 7,076,558 | B1 * | 7/2006 | Dunn | 709/229 |
| 2002/0120697 | A1 * | 8/2002 | Generous et al. | 709/206 |
| 2005/0262436 | A1 * | 11/2005 | Deen et al. | 715/513 |

* cited by examiner

*Primary Examiner*—Diane Mizrahi
(74) *Attorney, Agent, or Firm*—Fish & Richardson P.C.

(57) ABSTRACT

A unified messaging system, method, apparatus, individual components and the like are disclosed. The unified messaging system comprises a server, a client and a synchronization application for synchronizing voicemail messages and fax messages on both the server and the client is disclosed. The server messages may include received messages and sent messages, each of which is indexed according to their respective indices and read/unread statuses. Similarly, the client messages may include received messages and sent messages, each of which is indexed according to their respective indices and read/unread statuses.

21 Claims, 5 Drawing Sheets

SYNCHRONIZATION IN UNIFIED MESSAGING SYSTEMS

CROSS-REFERENCE TO RELATED APPLICATIONS

This application is a nonprovisional application of and claims priority to U.S. application Ser. No. 60/607,220, filed on Sep. 2, 2004.

BACKGROUND

The present application relates generally to messaging systems.

A messaging system can be used to convey information from a sender to a recipient. Conventional messaging systems use various input and delivery mechanisms including telephones, pagers, computers, recorders, answering machines and other systems to formulate and deliver the message content.

SUMMARY OF THE INVENTION

According to one aspect, a unified messaging system includes a server configured to store a plurality of server messages, a client configured to store a plurality of client messages and a synchronization application which synchronizes the client messages with the server messages associated with the client. The server messages includes voicemail messages and fax messages for a client, and the client messages includes voicemail messages and fax messages for the client and correspond generally to the server messages.

In some implementations, one or more of the following features may be present. The server messages include received messages and sent messages, and the client messages include received messages and sent messages. Each of the server messages includes a server message index and a read/unread status, each of the client messages includes a client message index and a read/unread status, and synchronizing the client messages with the server messages includes synchronizing server message indices with client message indices, and server message read/unread statuses with client message read/unread statuses In another implementation, the synchronization application determines whether a server message on the server has previously been synchronized to establish a corresponding client message on the client.

According to another aspect, a synchronization method includes storing a plurality of server messages containing voicemail messages and fax messages on a server, storing a plurality of client messages containing voicemail messages and fax messages corresponding generally to the server messages on a client, and synchronizing the client messages with the server messages.

In a related aspect, a synchronization method includes storing a plurality of server messages containing voicemail messages and fax messages on a server, storing a plurality of client messages containing voicemail messages and fax messages corresponding generally to the server messages on a client, and generating an identifier on the client and the server at each synchronization.

In various implementations, one or more of the following advantages may be present. Based on the results of the discrepancy assessment established during the synchronization, the synchronization application creates a list of synchronization actions that can be performed in order to synchronize the messages on the server with the messages on the client without having a need to maintain a history of all prior messages on the client. The state of messages on the client may also be updated so that requests may be sent to the server to update the state of messages on the server.

Other features and advantages will be readily apparent from the following detailed description, the accompanying drawings and the claims.

BRIEF DESCRIPTION OF THE DRAWINGS

Like reference numbers and designations in the various drawings indicate like elements.

DETAILED DESCRIPTION

Figure 1:
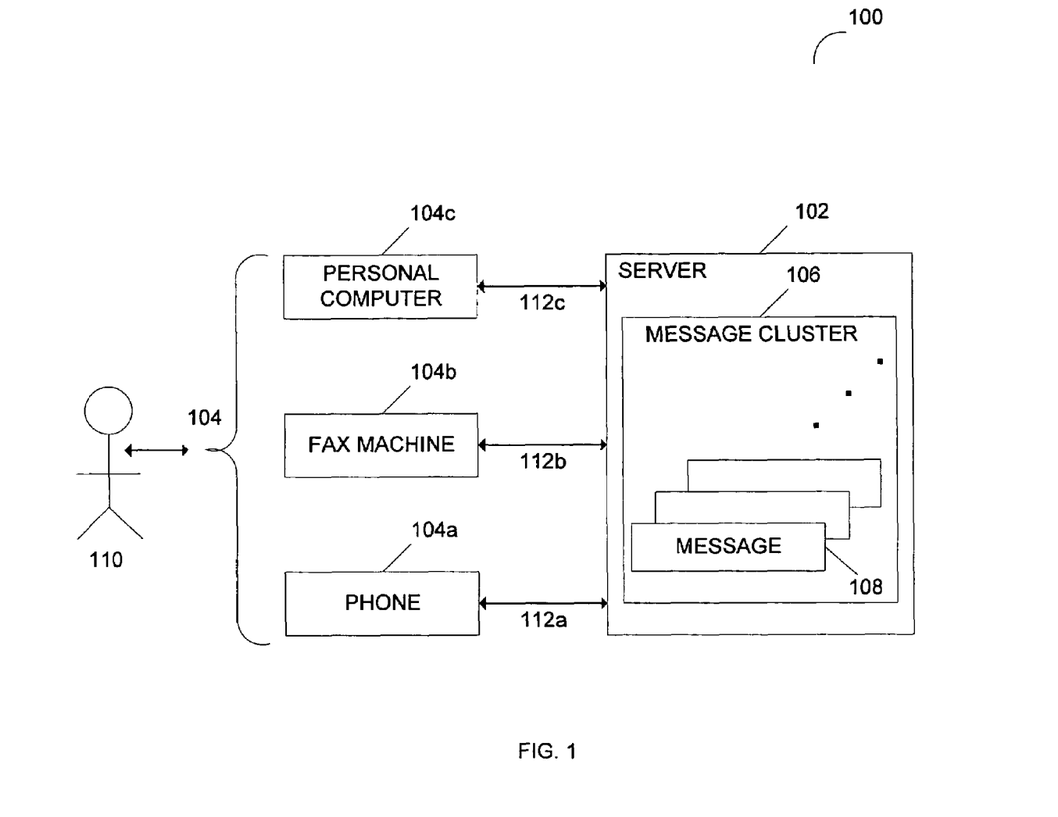
FIG. 1 is a block diagram of a unified messaging system according to one implementation.

As shown in FIG. 1, a unified messaging system 100 integrates several different communications media to allow a user 110 to send and retrieve voice 112a, fax 112b, and messages 112c (e.g., e-mail, text, etc.) from a single interface, whether it be a phone 104a, a fax machine 104b, or a personal computer 104c.

A unified messaging system 100 includes a server 102 that can store messages 108 of different types and of different communications media (e.g., received messages, sent messages, voicemail messages, fax messages, etc.). Messages 108 are grouped into message clusters 106, or mailboxes, that are associated with individual users 110, or groups of users. In one implementation, each individual message 108 includes, but is not limited to, a unique message index (e.g. identifiers), message content (e.g., voice, video, data), message properties (e.g., date and time, sender information), and message status (e.g., read, unread). A particular combination of message indexes and message statuses of all messages 108 in a given message cluster 106 is referred to as the state of the messages in the given cluster 106.

The unified message system 100 further includes one or more clients 104 for a given user 110. A client 104 can store local copies of the messages 108 that are stored on the server 102. A client 104 can include a synchronization application (discussed in greater detail below) that periodically synchronizes the client 104 with the server 102 to ensure that the state of messages on the server 102 is the same as the state of messages on the client 104. Discrepancies between the state of messages on the server 102 and the state of messages on the client 104 arise as a result of the user 110 deleting a message (e.g., on the server 102 and not deleting the message on the client 104, and visa versa), messages arriving at the server 102 and not being loaded on the client 104, the user 110 viewing a message on a client device or at the server 102, and so on. In one implementation, the synchronization application is not an e-mail application.

Figure 2A:
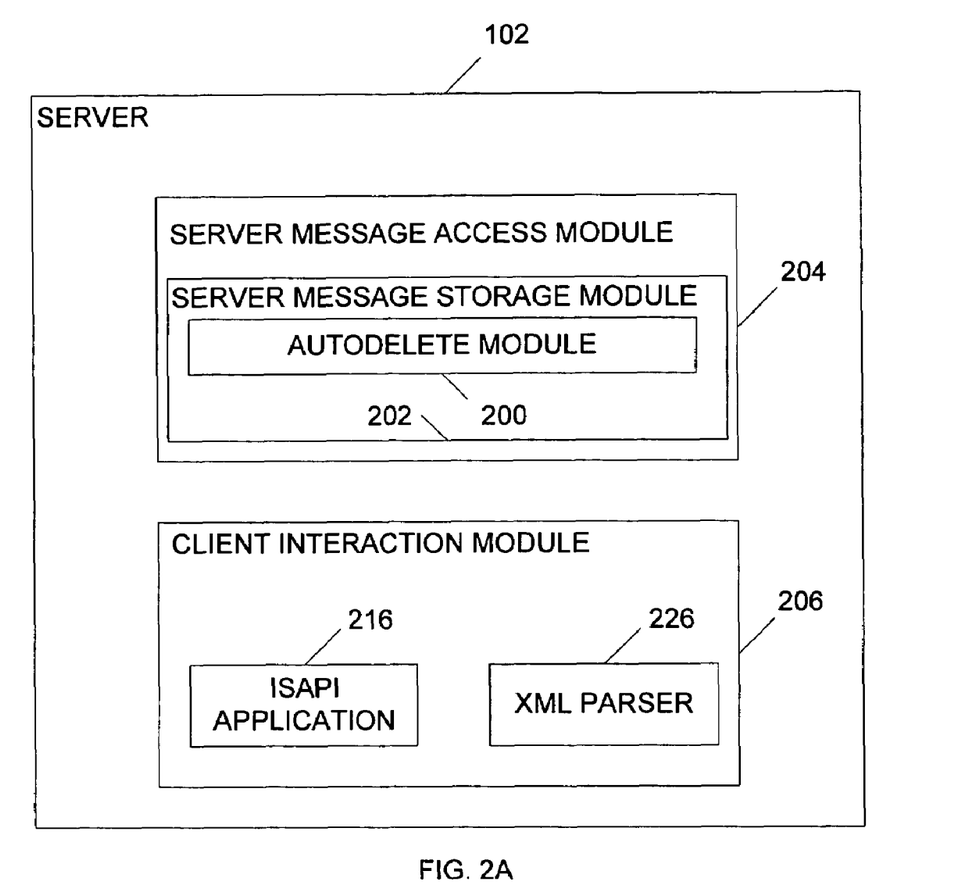
FIG. 2A is a block diagram of a server.

FIG. 2A illustrates components of a server 102 according to one implementation. The server 102 includes a server message storage module 202, which manages the storage of messages on the server 102. The server message storage module 202 can be an actual location where the messages are stored. Alternatively, the server message storage module 202 can contain information as to where and how the messages are stored on the server 102 or an external server.

The server 102 further includes an autodelete module 200, which automatically deletes certain messages 108 from the server 102 at predetermined intervals. For instance, the server 102 can be configured such that a given message 108 that arrives at the server 102 is automatically deleted from the server ten days after arriving. The autodelete module 202 can be a part of the server message storage module 202.

The server 102 further includes a server message access module 204, which is an interface to the server message storage module 202. The content and the properties of a given message in the server message storage module 202 are accessed and manipulated through the server message access module 204. The server message storage module 202 can be a part of the server message access module 204.

The server 102 further includes a client interaction module 206 through which the server 102 interacts with a client 104. In particular, the server 102 uses the client interaction module 206 to receive and process requests from a client 104. In one implementation, the client interaction module 206 includes an Internet Server Application Program Interface (ISAPI) application 216 for receiving the requests and an XML parser 226 for processing the requests. The client interaction module 206 can also include a telephone access interface (not shown), e.g., HTTP stream interface, and a web access (not shown), e.g., IVR interface.

Figure 2B:
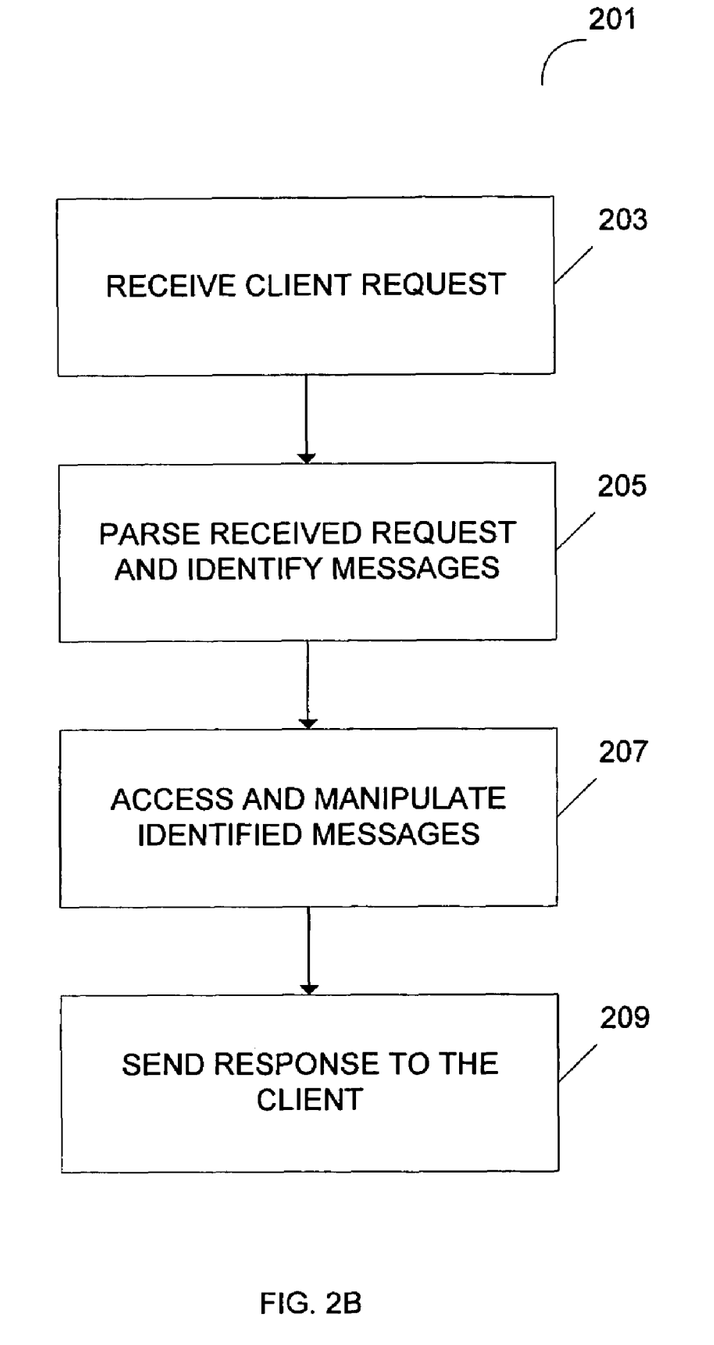
FIG. 2B is a flowchart illustrating a sequence of steps for processing a client request on a server.

Accordingly, as shown in a flow chart in FIG. 2B, the steps 201 for processing a request from a client 104 on the server 102 include receiving the request through, for example, the ISAPI application 216 (step 203). Processing the client's request further includes parsing the request using, for example, the XML parser 226 (step 205), which identifies the messages in the server message storage module 202 that need to be accessed. Processing the client's request further includes accessing the identified messages through the server message access module 204 and manipulating the identified messages in the server message storage module 202 per the client's request (207). Optimally, processing the client's request further can include sending a response to the client 104 (step 209). For instance, the response can include information requested by the client 104 and/or information as to whether the request was processed successfully or if there were errors.

Figure 3A:
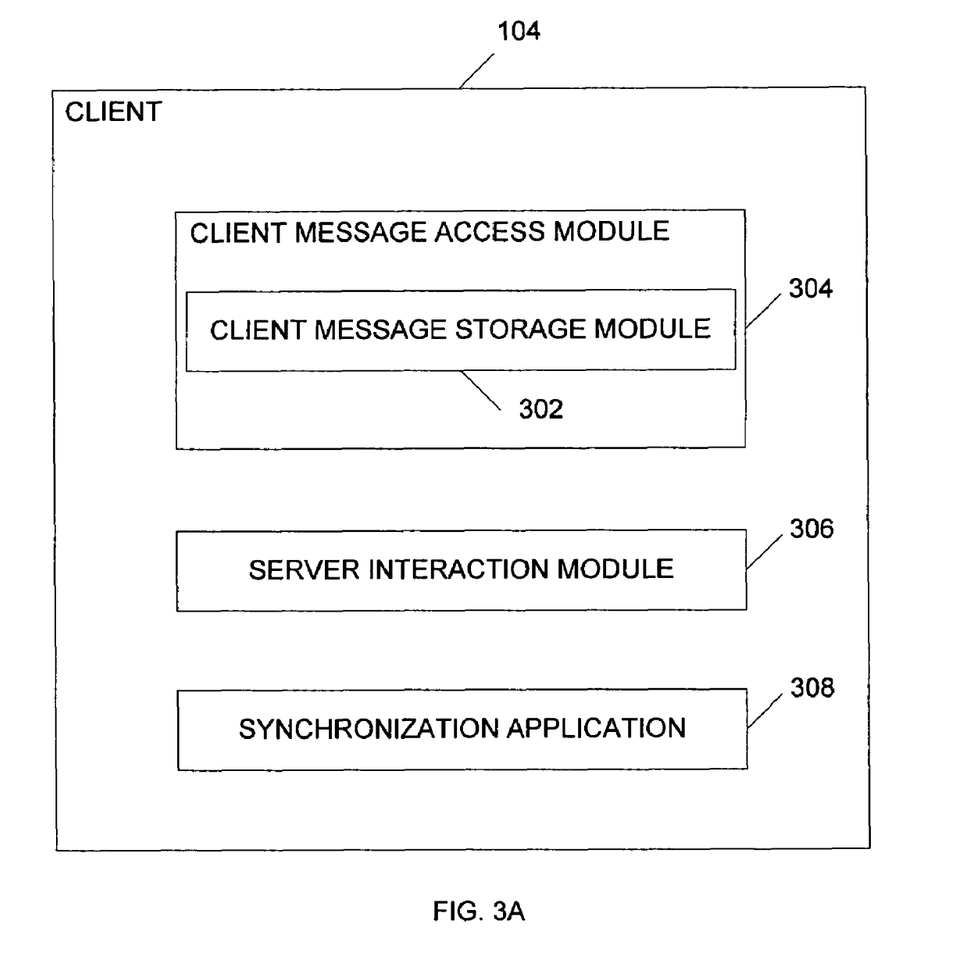
FIG. 3A is a block diagram of a client.

FIG. 3A illustrates components of a client 104 according to one implementation. The client 104 includes a client message storage module 302, which manages the storage of messages on the client 104. The client message storage module 302 can be an actual location where the messages are stored. Alternatively, the client message storage module 302 can contain information as to where and how the messages are stored on the client 104 or an external device.

The client 104 further includes a client message access module 304, which is an interface to the client message storage module 302. The content and the properties of a given message in the client message storage module 302 are accessed and manipulated through the client message access module 304. The client message storage module 302 can be part of the client message access module 304.

The client 104 further includes a server interaction module 306 through which the client 104 interacts with the server 102. In particular, the client 104 sends requests to the server 102 and receives the server's responses through the server interaction module 306. To send a request to the server 102, the client 104 first uses the server interaction module 306 to connect to the server 102 by establishing, for example, an HTTP connection. Subsequently, the server interaction module 306 exchanges data with the server 102 specific to the request using, for example, an XML parser.

The client 104 further includes a synchronization application 308, which is responsible for synchronizing the messages on the server 102 with the messages on the client 104. In particular, the synchronization application 104 receives the state of messages in the server message storage module 202 on the server 102 and compares it with the state of the messages in the client message storage module 302 on the client 104. The synchronization application 308 further identifies a set of actions that need to be performed to synchronize the messages on the server 102 with the messages on the client 104 and subsequently performs those actions.

Figure 3B:
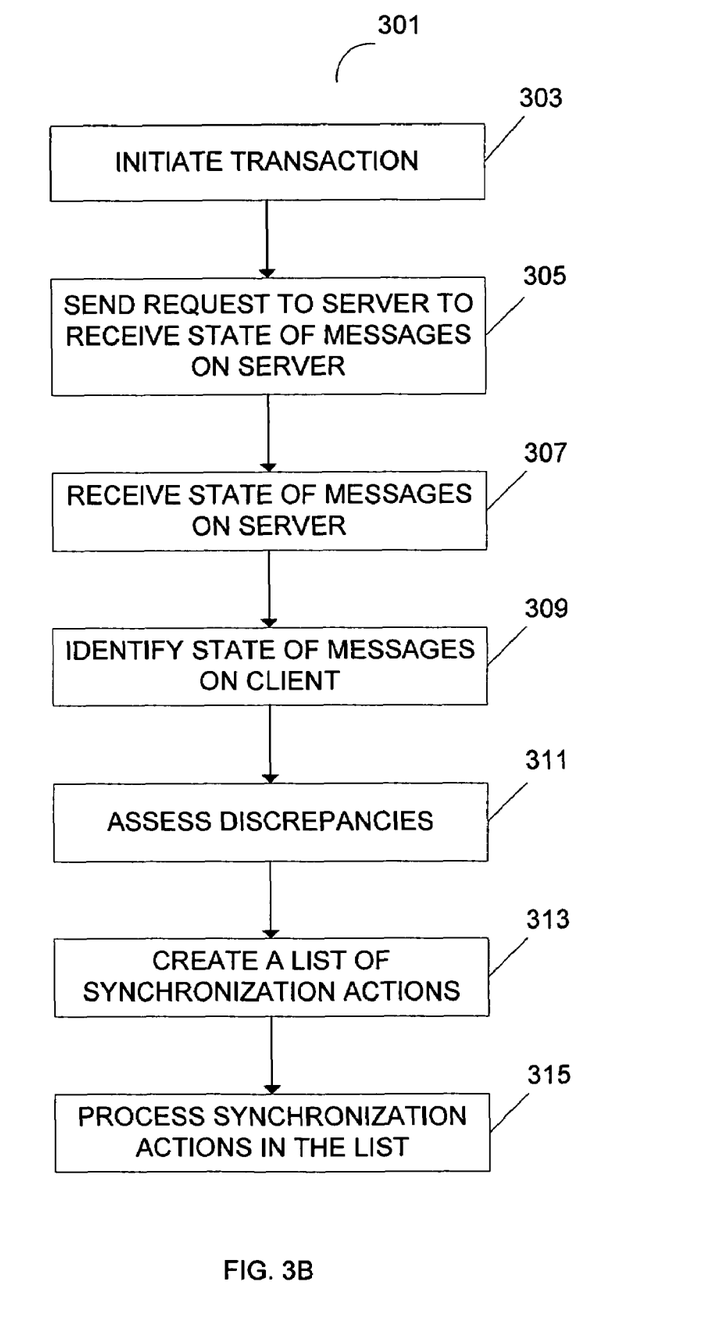
FIG. 3B is a flowchart illustrating a client-based synchronization process.

A process 301 that the synchronization application 308 uses to synchronize the messages on the server 102 with the messages on the client 104, according to one implementation, is outlined in more detail in FIG. 3B. Referring now to FIGS. 1 and 3B, the synchronization application 308 on the client 104 initiates synchronization (step 303) by establishing, for example, an HTTP connection with the server 102. A variety of conditions can cause the synchronization application 308 on the client 104 to initiate synchronization. For instance, the synchronization application 308 on the client 104 can initiate synchronization when it receives a new message notification from the server 102. The synchronization application 308 on the client 104 can also initiate synchronization when a message on the client 104 is deleted.

In one implementation, an unique ID is generated at each synchronization and saved on both the client 104 and the server 102. Prior to initiating the next synchronization, the client 104 transfers this unique ID to the server 102. The synchronization application 308 on the client 104 can proceed to synchronize the message on the client 104 and the server 102 after the server 102 compares and determines that the unique ID received from the client 104 and that saved on the server 102 corresponds. If the unique ID received from the client 104 and that is saved on the server 102 do not correspond, synchronization application 308 does not initiate a synchronization so as to avoid any unnecessary synchronization.

Other conditions that cause the synchronization application 308 on the client 104 to initiate synchronization can include, but are not limited to, the user 110 requesting synchronization, the client 104 connecting to the server 102, the state of the client 104 changing from offline to online, or a message on the client 104 changing status, a timer associated. Also, synchronization can be performed at predetermined intervals and initiated, for instance, by a synchronization timer.

Once synchronization is initiated (step 303), the synchronization application 308 on the client 104 sends a request to the server 102 through the server interaction module 306 to receive the state of the messages stored on the server 102 (step 305). The server 102 processes the request according to the steps outlined in reference to FIG. 2B and can send a response containing information about the state of the messages stored on the server 102 to the client 104.

Once the client 104 receives the state of the messages stored on the server 102 (step 307), the synchronization application 308 identifies the state of the messages stored on the client 104 (step 309) using the client message access module 304.

Subsequently, the client's synchronization application 308 assesses the discrepancies between the state of messages stored on the server 102 and the state of messages stored on the client 104 (step 311). In one implementation the discrepancy assessment involves comparing the indexes of the messages stored on the server 102 with the indexes of the messages stored on the client 104. For example, if the indexes of the messages on the server 102 are 1001, 1002, 1003 and 1004, and the indexes of the messages on the client 104 are 1001, 1002, and 1004, the message with index 1003 has been deleted from the client 104 but not from the server 102. The discrepancy assessment can further include comparing the statuses of the messages with the same indexes on the client 104 and on the server 102.

Based on the results of the discrepancy assessment (step 311) the synchronization application 308 creates a list of synchronization actions that need to be performed in order to synchronize the messages on the server 102 with the messages on the client 104 (step 313). The synchronization actions can include, but are not limited to, deleting messages on the client 104, changing the status of a given message of the client 104, sending a request to the server 102 to delete messages on the server 102, sending a request to the server 102 to change the status of a given message on the server 102. In one implementation, a list of synchronization actions is created based on the following rules:

1) If a new message has been added on the server 102 since the last synchronization (e.g., a new message has been received), the message is added on the client 104.

2) If a new message has been added on the client 104 since the last synchronization (e.g., a new message has been sent), the message is added on the server 102.

3) If a message on the server 102 has been marked as "read" since the last synchronization, the corresponding message on the client 104 is also marked as "read".

4) If a message on the client 104 has been marked as "read" since the last synchronization, the corresponding message on the server 102 is also marked as "read".

5) If a message on the server 102 has been marked as "unread" since the last synchronization, the corresponding message on the client 104 is also marked as "unread".

6) If a message on the client 104 has been marked as "unread" since the last synchronization, the corresponding message on the server 102 is also marked as "unread".

7) If a message on the server 102 has been deleted since the last synchronization, and the deletion was not performed by the autodelete module 200, the corresponding message on the client 104 is also deleted.

8) If a message on the client 104 has been deleted since the last synchronization, the corresponding message on the server 102 is also deleted.

Once the list of synchronization actions is created, the synchronization application 308 performs the synchronization actions in the list (step 315). Performing synchronization actions in the list can include, but is not limited to, updating the state of messages on the client 104 and sending requests to the server 102 to update the state of messages on the server 102.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN"), e.g., a wireless LAN, and a wide area network ("WAN"), e.g., the Internet.

The invention has been described in terms of particular embodiments, but other embodiments can be implemented and are within the scope of the following claims. For example, the operations of the invention can be performed in a different order and still achieve desirable results. As one example, the process depicted in FIG. 3B does not require the particular order shown, or sequential order, to achieve desirable results (e.g., step 305 can follow steps 307 and 309). Furthermore, synchronization application 308 can run on the client 104, or on the server 102. Moreover, a portion of the synchronization application 308 can run on the client 104, and a portion of the synchronization application 308 can run on the server 102. In certain implementations, multitasking and parallel processing may be preferable.

What is claimed is:

1. A unified messaging system comprising:
   a computer implemented server including a processor configured to store a plurality of server messages, the server messages including voicemail messages and fax messages for a client;
   a client configured to store a plurality of client messages, the client messages including voicemail messages and fax messages for the client and corresponding to the plurality of server messages; and
   a synchronization application for synchronizing the client messages with the server messages associated with the client including performing at least one synchronization action selected from a group comprising:
     a read/unread status of a client message to read when a read/unread status of a corresponding server message is set to read, and unread when the read/unread status of the corresponding server message is set to unread; and
     a read/unread status of a server message to read when a read/unread status of a corresponding client message is set to read, and unread when the read/unread status of the corresponding client message is set to unread.

2. The unified messaging system of claim 1, wherein the synchronization application excludes an e-mail application.

3. The unified messaging system of claim 1, wherein the server messages include received messages and sent messages, and the client messages include received messages and sent messages.

4. The unified messaging system of claim 1, wherein each of the server messages includes a server message index, and each of the client messages includes a client message index, and
   synchronizing the client messages with the server messages includes synchronizing server message indices with client message indices.

5. The unified messaging system of claim 4, wherein synchronizing server message indices with client message indices comprises:
   identifying server message indices;
   identifying client message indices;
   identifying one or more discrepancies between the server message indices and the client message indices; and
   generating one or more synchronization actions based on the identified discrepancies.

6. The unified messaging system of claim 5, wherein generating one or more synchronization actions includes generating a synchronization action from a group comprising:
   creating a new client message when a server message does not have a corresponding client message;
   creating a new server message when a client message does not have a corresponding server message;
   deleting a client message when a corresponding server message has been deleted; and
   deleting a server message when a corresponding client message has been deleted.

7. The unified messaging system of claim 1, further comprising:
   identifying server message read/unread statuses;
   identifying client message read/unread statuses; and
   identifying one or more discrepancies between the identified server message read/unread statuses and the identified client message read/unread statuses,
   where the client messages and the server messages associated with the client are synchronized based on the one or more identified discrepancies.

8. The unified messaging system of claim 1, wherein the synchronization application determines whether a server message on the server has previously been synchronized to establish a corresponding client message on the client.

9. The unified messaging system of claim 8, wherein the server message and the corresponding client message are respectively deleted from the server and the client when the synchronization application determines that the server message on the server has previously been synchronized to establish a corresponding client message on the client.

10. The unified messaging system of claim 8, wherein the synchronization application deletes the corresponding client message on the client when the server message is determined to have been deleted since a last synchronization.

11. A unified messaging system comprising:
    a computer implemented server including a processor configured to store a plurality of server messages, the server messages including voicemail messages and fax messages for a client;
    a client configured to store a plurality of client messages, the client messages including voicemail messages and fax messages for the client and corresponding to the plurality of server messages; and
    a synchronization application for synchronizing the client messages with the server messages associated with the client,
    wherein the synchronization application determines whether a server message on the server has previously been synchronized to establish a corresponding client message on the client, and
    wherein the server message is downloaded to the client when the synchronization application determines that the server message on the server has not previously been synchronized to establish a corresponding client message on the client.

12. A synchronization method comprising:
    storing a plurality of server messages containing voicemail messages and fax messages on a server;
    storing a plurality of client messages containing voicemail messages and fax messages corresponding to the server messages on a client; and
    synchronizing the client messages with the server messages using a processor including performing at least one synchronization action selected from a group comprising:
      setting a read/unread status of a client message to read when a read/unread status of a corresponding server message is set to read; and
      setting a read/unread status of a server message to read when a read/unread status of a corresponding client message is set to read.

13. The method of claim 12, further comprising indexing the server messages as server message indices and the client messages as client message indices,
    wherein synchronizing the client messages with the server messages includes synchronizing the server message indices with the client message indices.

14. The method of claim 13, wherein synchronizing the client messages with the server messages comprises:
identifying server message indices;
identifying client message indices;
identifying one or more discrepancies between the server message indices and the client message indices; and
generating one or more synchronization actions based on the identified discrepancy.

15. The method of claim 14, wherein generating one or more synchronization actions includes generating at least one synchronization action from a group comprising:
creating a new client message when a server message does not have a corresponding client message;
creating a new server message when a client message does not have a corresponding server message;
deleting a client message when a corresponding server message has been deleted; and
deleting a server message when a corresponding client message has been deleted.

16. The method of claim 12, wherein synchronizing the client messages with the server messages includes setting the read/unread status of both the client message and the server message to read when the read/unread status of either the client message or the server message shows a read status.

17. The method of claim 16, further comprising:
identifying server message read/unread statuses;
identifying client message read/unread statuses; and
identifying one or more discrepancies between the server message read/unread statuses and the client message read/unread statuses,
where synchronizing the client messages with the server messages is performed based on the one or more identified discrepancies.

18. The method of claim 12, wherein synchronizing the client messages with the server messages includes determining whether a server message has previously been synchronized with a corresponding client message.

19. A method comprising:
storing a plurality of server messages containing voicemail messages and fax messages on a server;
storing a plurality of client messages containing voicemail messages and fax messages corresponding to the server messages on a client; and
synchronizing the client messages with the server messages using a processor,
wherein synchronizing the client messages with the server messages includes:
determining whether there is an extra message on the server that does not have a corresponding message on the client, and is more recent than a prior synchronization; and
determining whether at least one server message has previously been synchronized with a corresponding client message, and when the at least one server message on the server has not previously been synchronized with a corresponding client message on the client, the method further comprising:
downloading at least one server message to the client after determining the at least one server message on the server has not previously been synchronized to establish a corresponding client message on the client.

20. The method of claim 19, further comprising downloading the extra message to the client after determining the extra message that does not have a corresponding message on the client is more recent than the prior synchronization.

21. The method of claim 19, further comprising deleting the extra message from the server after determining the extra message that does not have a corresponding message on the client is not more recent than the prior synchronization.

* * * * *

(12) INTER PARTES REEXAMINATION CERTIFICATE (904th)
United States Patent
Vendrow et al.

(10) Number: US 7,702,669 C1
(45) Certificate Issued: Jul. 14, 2014

(54) SYNCHRONIZATION IN UNIFIED MESSAGING SYSTEMS

(75) Inventors: Vlad Vendrow, Redwood Shores, CA (US); Vlad Shmunis, Hillsborough, CA (US)

(73) Assignee: RingCentral, Inc., San Mateo, CA (US)

Reexamination Request:
No. 95/001,844, Dec. 8, 2011

Reexamination Certificate for:
Patent No.: 7,702,669
Issued: Apr. 20, 2010
Appl. No.: 11/219,532
Filed: Sep. 2, 2005

Related U.S. Application Data

(60) Provisional application No. 60/607,220, filed on Sep. 2, 2004.

(51) Int. Cl.
*G06F 17/30* (2006.01)

(52) U.S. Cl.
USPC .......................................................... 707/620

(58) Field of Classification Search
None
See application file for complete search history.

(56) References Cited

To view the complete listing of prior art documents cited during the proceeding for Reexamination Control Number 95/001,844, please refer to the USPTO's public Patent Application Information Retrieval (PAIR) system under the Display References tab.

*Primary Examiner* — Ovidio Escalante (57) ABSTRACT

A unified messaging system, method, apparatus, individual components and the like are disclosed. The unified messaging system comprises a server, a client and a synchronization application for synchronizing voicemail messages and fax messages on both the server and the client is disclosed. The server messages may include received messages and sent messages, each of which is indexed according to their respective indices and read/unread statuses. Similarly, the client messages may include received messages and sent messages, each of which is indexed according to their respective indices and read/unread statuses.

US 7,702,669 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-21 are cancelled.

New claims 22-34 are added and determined to be patentable.

22. *A unified messaging system comprising:*
    *a computer implemented server including a processor configured to store a plurality of server messages grouped into a message cluster, the server messages including voicemail messages and fax messages for a client;*
    *a first client configured to store a first plurality of client messages, the first client messages including voicemail messages and fax messages for the first client and corresponding to the plurality of server messages;*
    *a first synchronization application for synchronizing the first client messages with the server messages associated with the first client including performing at least one synchronization action selected from the group consisting of:*
        *a read/unread status of a first client message to read when a read/unread status of a corresponding server message is set to read and unread when the read/unread status of the corresponding server message is set to unread; and*
        *a read/unread status of a server message to read when a read/unread status of a corresponding first client message is set to read, and unread when the read/unread status of the corresponding first client message is set to unread;*
    *a second client that is not the first client configured to store, separately from the first plurality of client messages, a second plurality of client messages, the second client messages including voicemail messages and fax messages for the second client and corresponding to the plurality of server messages;*
    *a second synchronization application for synchronizing the second client messages with the server messages including performing at least one synchronization action selected from the group consisting of:*
        *a read/unread status of a second client message to read when a read/unread status of a corresponding server message is set to read, and unread when the read/unread status of the corresponding server message is set to unread; and*
        *a read/unread status of a server message to read when a read/unread status of a corresponding second client message is set to read and unread when the read/unread status of the corresponding second client message is set to unread.*

23. *The unified messaging system of claim 22, wherein the first or second client comprises a client message storage module configured to store information as to where at least one of the first or second plurality of client messages is stored on an external device.*

24. *The unified messaging system of claim 22, wherein the first synchronization application and the second synchronization application is the same synchronization application configured to run on the server.*

25. *The unified messaging system of claim 22, wherein the first and second synchronization applications exclude an e-mail application.*

26. *The unified messaging system of claim 22, wherein the server messages include received messages and sent messages, the first client messages include received messages and sent messages, and the second client messages include received messages and sent messages.*

27. *A unified messaging system comprising:*
    *a computer implemented server including a processor configured to store a plurality of server messages grouped into a message cluster, the server messages including voicemail messages and fax messages for a client;*
    *a first client configured to store a first plurality of client messages, the first client messages including voicemail messages and fax messages for the first client and corresponding to the plurality of server messages; and*
    *a first synchronization application for synchronizing the first client messages with the server messages associated with the first client,*
    *wherein the first synchronization application determines whether a server message on the server has previously been synchronized to establish a corresponding client message on the first client, and*
        *wherein the server message is downloaded to the first client when the synchronization application determines that the server message on the server has not previously been synchronized to establish a corresponding client message on the first client;*
    *a second client that is not the first client configured to store, separately from the first plurality of client messages, a second plurality of client messages, the second client messages including voicemail messages and fax messages for the second client and corresponding to the plurality of server messages;*
    *a second synchronization application for synchronizing the second client messages with the server messages associated with the second client,*
    *wherein the second synchronization application determines whether the server message on the server has previously been synchronized to establish a corresponding client message on the second client, and*
        *wherein the server message is downloaded to the second client when the second synchronization application determines that the server message on the server has not previously been synchronized to establish a corresponding client message on the second client.*

28. *The unified messaging system of claim 27, wherein the first or second client comprises a client message storage module configured to store information as to where at least one of the first or second plurality of client messages is stored on an external device.*

29. *The unified messaging system of claim 27, wherein the first synchronization application and the second synchronization application is the same synchronization application configured to run on the server.*

30. *A synchronization method comprising:*
    *storing a plurality of server messages containing voicemail messages and fax messages on a server, wherein the server messages are grouped into a message cluster;* storing a plurality of client messages containing voicemail messages and fax messages corresponding to the server messages on a first client;

storing, separately from the first plurality of client messages, a second plurality of client messages containing voicemail messages and fax messages corresponding to the server messages on a second client that is not the first client;

synchronizing the first client messages with the server messages using a processor including performing at least one synchronization action selected from the group consisting of:
  setting a read/unread status of a first client message to read when a read/unread status of a corresponding server message is set to read; and
  setting a read/unread status of a server message to read when a read/unread status of a corresponding first client message is set to read;

synchronizing the second client messages with the server messages using a processor including performing at least one synchronization action selected from the group consisting of:
  setting a read/unread status of a first client message to read when a read/unread status of a corresponding server message is set to read; and
  setting a read/unread status of a server message to read when a read/unread status of a corresponding second client message is set to read.

31. The method of claim 30, wherein storing the first or second plurality of client messages comprises storing on the first or second client information as to where at least one of the first or second plurality of client messages is stored on an external device.

32. A method comprising:
storing a plurality of server messages containing voicemail messages and fax messages on a server, wherein the server messages are grouped into a message cluster;

storing a plurality of client messages containing voicemail messages and fax messages corresponding to the server messages on a first client;

storing, separately from the first plurality of client messages, a second plurality of client messages containing voicemail messages and fax messages corresponding to the server messages on a second client that is not the first client;

synchronizing the first client messages with the server messages using a processor;

synchronizing the second client messages with the server messages using a processor;

wherein synchronizing the first client messages with the server messages includes:
  determining whether there is an extra message on the server that does not have a corresponding message on the first client, and is more recent than a prior synchronization between the first client and the server; and
  determining whether at least one server message has previously been synchronized with a corresponding first client message, and when the at least one server message on the server has not previously been synchronized with a corresponding first client message on the first client, the method further comprising:
    downloading at least one server message to the first client after determining the at least one server message on the server has not previously been synchronized to establish a corresponding first client message on the first client;

wherein synchronizing the second client messages with the server messages includes:
  determining whether there is an extra message on the server that does not have a corresponding message on the second client, and is more recent than a prior synchronization between the second client and the server;
  determining whether the at least one server message has previously been synchronized with a corresponding second client message, and when the at least one server message on the server has not previously been synchronized with a corresponding second client message on the second client, the method further comprising:
    downloading at least one server message to the second client after determining the at least one server message on the server has not previously been synchronized to establish a corresponding second client message on the second client.

33. The method of claim 32, wherein storing the first or second plurality of client messages comprises storing, on the first or second client, information as to where at least one of the first or second plurality of client messages is stored on an external device.

34. A synchronization method comprising:
storing a plurality of server messages containing voicemail messages and fax messages on a server, wherein the server messages are grouped into a message cluster;

storing a first plurality of client messages containing voicemail messages and fax messages corresponding to the server messages on a first client;

storing, separately from the first plurality of client messages, a second plurality of client messages containing voicemail messages and fax messages corresponding to the server messages on a second client that is not the first client;

synchronizing the first client messages with the server messages using a processor including performing at least one synchronization action selected from the group consisting of:
  setting a read/unread status of a first client message to read when a read/unread status of a corresponding server message is set to read; and
  setting a read/unread status of a server message to read when a read/unread status of a corresponding first client message is set to read;

synchronizing the second client messages with the server messages using a processor including performing at least one synchronization action selected from the group consisting of:
  setting a read/unread status of a first client message to read when a read/unread status of a corresponding server message is set to read; and
  setting a read/unread status of a server message to read when a read/unread status of a corresponding second client message is set to read;

wherein synchronizing the first client messages with the server messages includes performing, prior to performing any synchronization actions to synchronize the first client messages with the server messages since a last synchronization between the first client and the server, the steps of:
  establishing a first network connection between the first client and the server;
  determining states of at least two first client messages of the plurality of first client messages and states of at least two server messages of the plurality of server messages including using Hypertext Transfer Protocol (HTTP) over the first network connection to obtain the states of the at least two first client messages from the first client or to obtain the states of the at least two server messages from the server;

performing a first discrepancy assessment between the determined states of the at least of two server messages and the determined states of the at least two first client messages; and determining, based on results of the first discrepancy assessment, a first set of one or more synchronization actions to be performed to synchronize the first client messages with the server messages; and using Hypertext Transfer Protocol (HTTP) over the first network connection to cause at least one of the first set of synchronization actions to be performed;

wherein synchronizing the second client messages with the server messages includes performing, prior to performing any synchronization actions to synchronize the second client messages with the server messages since a last synchronization between the second client and the server, the steps of:

establishing a second network connection between the second client and the server;

determining states of at least two second client messages of the plurality of second client messages and states of at least two server messages of the plurality of server messages including using Hypertext Transfer Protocol (HTTP) over the second network connection to obtain the states of the at least two second client messages from the second client or to obtain the states of the at least two server messages from the server;

performing a second discrepancy assessment between the determined states of the at least of two server messages and the determined states of the at least two second client messages; and determining, based on results of the second discrepancy assessment, a second set of one or more synchronization actions to be performed to synchronize the second client messages with the server messages; and using Hypertext Transfer Protocol (HTTP) over the second network connection to cause at least one of the second set of synchronization actions to be performed.

\* \* \* \* \*